(12) United States Patent
Wang et al.

(10) Patent No.: US 8,239,536 B2
(45) Date of Patent: Aug. 7, 2012

(54) SYSTEM FOR GENERIC SERVICE MANAGEMENT IN A DISTRIBUTED AND DYNAMIC RESOURCE ENVIRONMENT, PROVIDING CONSTANT SERVICE ACCESS TO USERS

(75) Inventors: Qi Wang, Markham (CA); Khalid Ahmed, Markham (CA); Leo Stutzmann, Brooklin (CA); Christopher Andrew Norman Smith, San Francisco, CA (US)

(73) Assignee: Platform Computing Corporation, Markham, Ontario (CA)

( * ) Notice: Subject to any disclaimer, the term of this patent is extended or adjusted under 35 U.S.C. 154(b) by 890 days.

(21) Appl. No.: 11/694,658

(22) Filed: Mar. 30, 2007

(65) Prior Publication Data

US 2008/0243993 A1  Oct. 2, 2008

(51) Int. Cl.
*G06F 15/173* (2006.01)
*G06F 7/00* (2006.01)

(52) U.S. Cl. .... 709/226; 709/223; 709/225; 707/999.01
(58) Field of Classification Search .................. None
See application file for complete search history.

(56) References Cited

U.S. PATENT DOCUMENTS

| | | | |
|---|---|---|---|
| 6,901,445 B2 * | 5/2005 | McCanne et al. | 709/225 |
| 2002/0152305 A1 * | 10/2002 | Jackson et al. | 709/224 |
| 2003/0046396 A1 * | 3/2003 | Richter et al. | 709/226 |
| 2003/0167270 A1 * | 9/2003 | Werme et al. | 707/10 |
| 2004/0111506 A1 * | 6/2004 | Kundu et al. | 709/223 |
| 2005/0120160 A1 * | 6/2005 | Plouffe et al. | 711/1 |
| 2009/0109959 A1 * | 4/2009 | Elliott et al. | 370/352 |

* cited by examiner

*Primary Examiner* — Wen-Tai Lin
(74) *Attorney, Agent, or Firm* — Baker & McKenzie LLP

(57) ABSTRACT

A service controller for providing centralized service management, control and placement, as well as guaranteed failover, in a dynamic and distributed computing environment. The service controller works in conjunction with a computing resource supply manager, which supplies the required resources so that the service controller can run the service on the allocated resources. The number of active service instances may dynamically increase or decrease in accordance with changing availability of or demand for resources. The service controller monitors the service instances and takes appropriate action in the event of service instance failures. The service controller is provided with a service director component, which records and tracks, for each service instance which has been started on a particular resource/host, the IP address of such host, through a name location service, thus allowing end-users to locate the service regardless of where the service instances are physically running.

25 Claims, 4 Drawing Sheets

SYSTEM FOR GENERIC SERVICE MANAGEMENT IN A DISTRIBUTED AND DYNAMIC RESOURCE ENVIRONMENT, PROVIDING CONSTANT SERVICE ACCESS TO USERS

FIELD OF THE INVENTION

Disclosed herein are systems and methods for managing, controlling and keeping track of services/applications in a distributed computing environment.

BACKGROUND

A service/application (referred to hereinafter as a service) is a program that typically runs on a single host in isolation. Examples of such a service may include a file transfer protocol (FTP) service, a Tomcat™ service, a web service, and an audio/video streaming service. By use of the system disclosed herein, such individual services may be run on multiple hosts in a distributed computing environment. In the context of a distributed computing environment, such services are considered to be transportable in that they may be run on multiple hosts and/or migrated from one host to another.

Prior art service controller systems are known, such as the "init" service on the UNIX™ operating system and the "Service Control Manager" on Microsoft™ Windows™. However, these prior art service controllers are limited to a single host environment and have no application in distributed computing environments. Also known are high availability managers such as Veritas Cluster Server™; however these are static, are not transportable and do not scale, and thus do not provide for multiple service instances. Also known are commercial database products, such as those from Oracle™, and MySQL, which provide for guaranteed failover.

SUMMARY OF THE INVENTION

Described herein are systems and methods for managing, controlling and tracking services in a distributed computing environment. More particularly, disclosed embodiments relate to a service controller for providing centralized service management, control and placement, as well as guaranteed failover, in a dynamic and distributed computing environment.

A service may have multiple concurrent instances (referred to herein as service instances) running on one or multiple physical or virtual hosts. The service can be run in such a fashion that the service will appear to users as behaving as a single service, and managed to be running all the time, making the service appear to be static and permanent.

In order to be able to run a particular service, certain computing resources must be made available from the distributed computing environment to host such service or services. In this context, resources may encompass any types of computing resources that may be required in order to run the services, including hardware (such as servers, database servers, computer memory, computer processing unit (CPU) time, mainframe computers, networks, network storage, scientific instruments, and other computing devices), as well as software, databases, software licenses, available network services and other non-hardware resources. The service controller is provided with information regarding the computing resource requirements (such as for example, operating system requirements, memory, central processing unit (CPU) factors and swap space requirements) that are required or desired to run a particular service. This and other information is loaded, typically as an extensible markup language (XML) format file, in the service controller in the form of a service definition.

The service controller works in conjunction with a computing resource supply manager (referred to herein as resource supply manager), which determines whether the requested computing resources are available within the distributed computing environment. If so, the appropriate computing resources/host machines (generally referred to herein as resources) are allocated to the particular service. The service controller then issues a request to the resource supply manager to initiate and run the service or services on the allocated resources, and the service or services are hosted thereon.

Where a range of service instances for a particular service are desired to be run concurrently, the number of active instances may dynamically increase or decrease in accordance with changing conditions, e.g. due to changes in availability of or demands for resources, or due to changes in load for the particular service.

The service controller can also monitor the active (running) service instances and take appropriate action in the event of service instance failures, for example, to attempt to restart the instance on the same resource or to attempt to migrate the service instance by requesting a replacement resource.

In addition, the service controller is provided with a service director component, which records and tracks, for each service instance which has been started on a particular resource/host, the service name and the Internet protocol (IP) address of such host, and publishes the service name and IP address through a name look-up service, such as a domain name service (DNS). This allows end-users to locate the service (e.g. a web service) regardless of where the service instances are physically running. Furthermore, this allows the service instances to be tracked in the event there is a resource failure and the instance(s) is(are) migrated to replacement resources. The service director may be an internal or external data store or database of operating service instances and other relevant tracking information regarding those instances.

BRIEF DESCRIPTION OF THE DRAWINGS

Reference is made to the following descriptions taken in conjunction with the accompanying drawings.

DETAILED DESCRIPTION OF THE INVENTION

Figure 1:
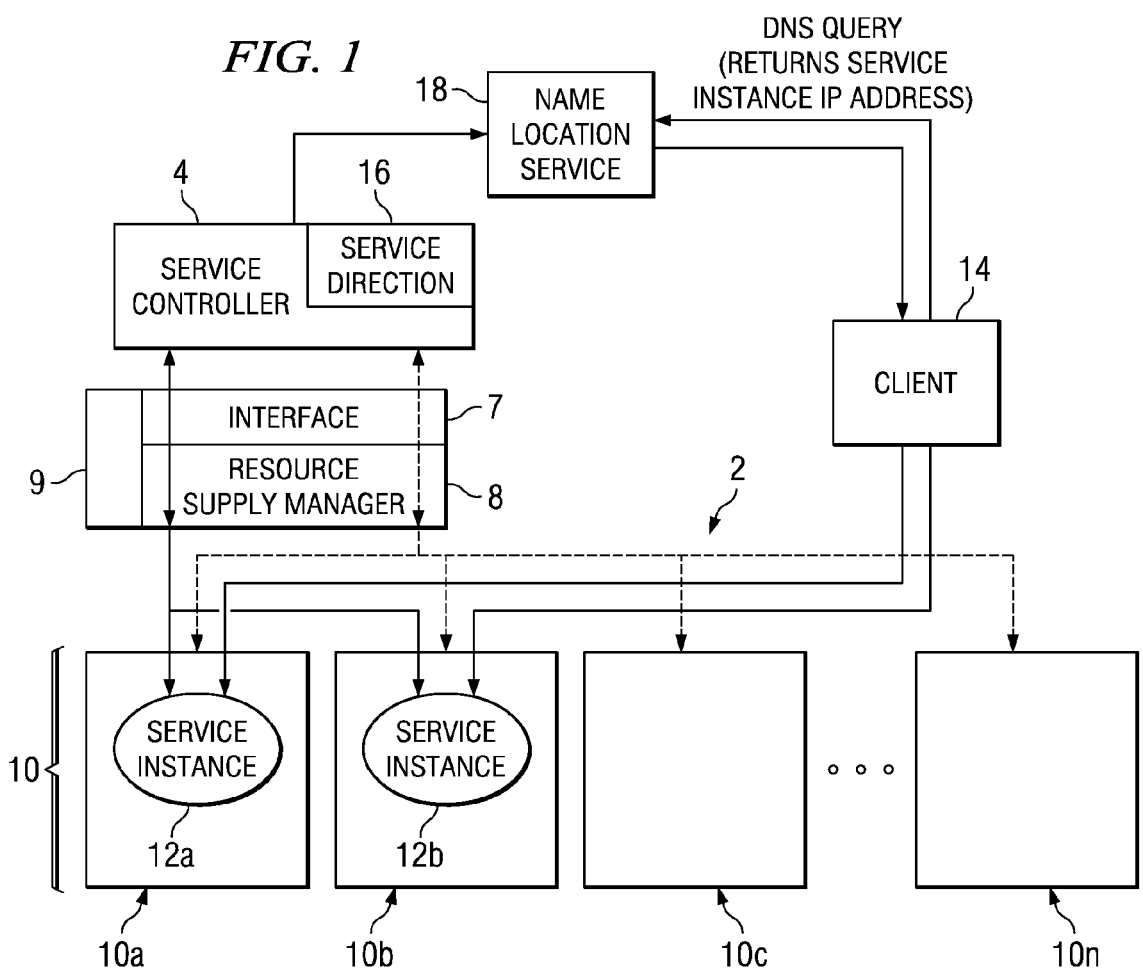
FIG. 1 is a diagrammatic representation of the system of the present invention.

Disclosed herein is an apparatus and method for managing and controlling services in a distributed computing network. FIG. 1 is a diagrammatic representation of a preferred embodiment of the present disclosure, and illustrates the present system as part of a distributed computing environment 2. A service controller 4 manages the running of certain services on the distributed computing environment 2. The distributed computing environment 2 has various pooled or shared resources 10 on some or all of which the services can be run. The service controller is provided with a service definition regarding the particular service, which service definition includes information regarding the resource requirements for running the service, and how the service should be run (e.g. how many service instances should be running at one time). The service definition provides information regarding the properties of the service such as the following:

i) general information, such as the name, description, priority, number of concurrent instances desired to be running at any one time (which for example may be expressed as a range of min/max values);

ii) control policies, such as whether the service should be started manually or automatically, dependencies among services, maximum number of times to restart a service in the event of a failure, how frequently a heartbeat signal should be expected from the service instance;

iii) allocation policies which describe the kinds of resources required by the service; and iv) container descriptions, which describe how to start/stop service instances on different platforms.

The service definition may be pre-stored on the service controller 4 or may be loaded thereon when necessary via an application program interface. The system also provides an application program interface (not shown), by means of which an administrator or user can create, remove or edit a service definition "on the fly." In addition, specific commands may be issued by an administrator to the service controller 4 via the application program interface, such as start/stop commands, which may override the existing service definitions. The service controller 4 requests the required resources from a resource supply manager 8, which determines according to its resource allocation policies, whether the requested resources are available from the distributed computing environment. (As used herein, the resource supply manager 8 may refer to any computing resource supply manager for managing resources in a distributed computing environment, such as Platform Enterprise Grid Orchestrator™). For this purpose, the resource supply manager 8 may comprise a resource allocation policy database 9. The request for resources may be made through an interface 7. If the requested resources are available, these are allocated to the service controller 4.

For the purposes of this disclosure, service instances are generally depicted herein as being hosted on separate host resources. However, it should be understood that it is possible for a particular host resource to host multiple services or service instances. This will be dictated by the nature and type of the host resource and the requirements of the service instances that are being hosted thereon. The service definition can specify whether a service will permit a host to be shared with other services or whether it requires a dedicated host.

In the particular example illustrated in FIG. 1, two instances of a particular service are required to be run. Accordingly, two suitable resources are requested from the resource supply manager 8. The resource supply manager 8 determines that the requested resources are available and allocates resources 10a and 10b to the service controller 4 to host/run the service. The resource supply manager 8 will notify the service controller that the requested resources have been made available and allocated. The service controller then can initiate the service and run the service instances 12a and 12b on the resources 10a and 10b respectively. The service instances can be made available to a client 14. For example, where the services 12a and 12b are instances of a web service being hosted on two web server machines, the client 14 would represent an internet browser accessing the web-site. The service controller 4 contains a service director component 16, which records and tracks the location (i.e. the particular physical resources) on which the service instances are running. This information can be conveniently provided in the form of an IP address and is published to a name look-up service 18, such as DNS. Using this system, the client 14 can readily locate through the name look-up service 18 where the instances of the required service are running as illustrated in the figure. With the IP address returned from the name look-up service, the client 14 can access such service instance as necessary. The service director component 16 of the service controller 4 may be an internal or external data store or database of operating service instances and other relevant tracking information regarding those instances, and can then be responsible for maintenance of the instances in the above-described name location service 18.

Having multiple instances of a particular service running at one time is appropriate, for example, when high demand is expected for a particular service or to reduce the risk that a particular service will be completely unavailable/inaccessible in the event of a failure. In this vein, the service definition for a particular service may specify an acceptable range of concurrent service instances (using a minimum and maximum). In certain embodiments, for example, between 5 and 10 instances of a web service might be the required service availability at any one time. In this example, where the resource supply manager 8 determines that less than 5 resources are available, or less than 5 resources fulfilling a certain performance requirement are available, then the service might be precluded from running, and in this example the requested service will not be run and the service director component 16 will wait or ask the resource supply manager 8 again for the resources (up to a preset number of times). The resources available are dynamically changing as resources in the distributed computing environment are allocated to or released by other services. When enough resources (5 or more in the present example) are available, for instance if 7 resources are available, the resources are allocated and the service instances are hosted and run on such resources. In this case, the service controller 4 may continue to communicate with the resource supply manager 8 to request additional resources in the event more become available, up to the maximum of 10 in total.

Due to changes in the demand and supply of resources, the resource supply manager may also request that some resources be returned to the pool of resources so other services can be run. Accordingly, the number of concurrent instances of a particular service may fluctuate. In this fashion, the resources are more efficiently utilized. The dynamically changing service instances are updated and tracked through use of the service director component 16.

The service controller 4 can monitor each active service instance of a particular service. In the event of a service instance failure, the service controller 4 can attempt to restart the service instance on the resource. Alternatively, the service controller 4 can request that the resource supply manager 8 provide it with a suitable replacement resource(s) and, if such is available, have the service instance restarted on the new resource. One way in which such monitoring can be achieved is by heartbeat checking; service instances can be configured to periodically send a signal (heartbeat) to the service controller. If no heartbeat is detected for a particular service instance, this may indicate that the host resource is down or the service instance has "hung" (for example, caused by a software defect), and appropriate action can be taken. (In addition to monitoring the service instances, the service controller 4 can also be adapted to monitor the allocated resources; this can be achieved through communication with the resource supply manager. The resource supply manager can be configured to report to the service controller when there is a status change in an allocated resource, or the service controller may intermittently request a status update from the allocated resources. Such actions may include restarting the service instance on a new resource. The use of the above-mentioned service director component 16 to update and track the location of the service instances enables the service instances to be readily located and accessed, even if a service instance has failed and subsequently been migrated to a different resource. This failover system is particularly useful when the service involved is a critical service.

In addition, the disclosed system can facilitate the management of multiple services which may have dependencies or compete for resources. The service definition can specify such dependencies and/or the priority of the services. Dependencies refer to the pre-conditions for starting a service. By way of example, it may be necessary that Service A be started before Service B can be started. A particular service may also be given a higher priority so that when it is directly competing for the same types of resources with one or more other services, it has a greater chance of obtaining such resources. Similarly, when the resource supply manager wants some of the allocated resources back from running services, the service controller can also take into account the different priorities when deciding which resources to give back and which service instances to stop. By way of example only, in an enterprise utilizing a distributed computing environment to run various of its services, customer relationship management services may be given a higher priority than an intranet service.

Figure 2:
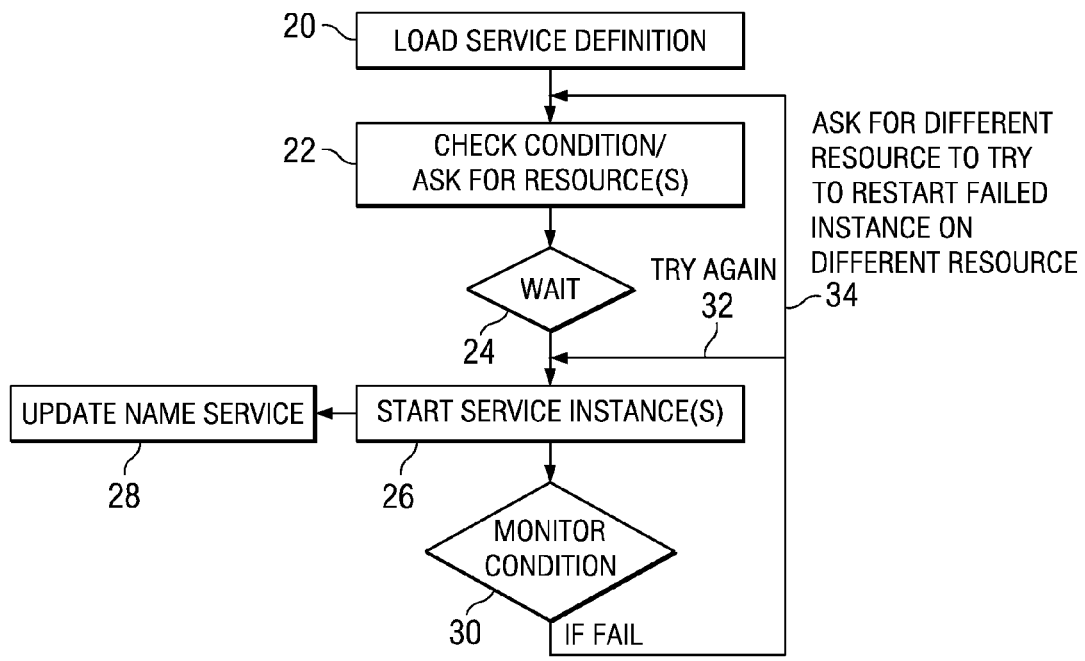
FIG. 2 is a flowchart depicting some of the interactions at the service controller.

Some of the above described interactions at the service controller are illustrated in the flowchart of FIG. 2. Firstly, the service definition for the particular service is loaded on the service controller (block 20). The service controller requests the required resources (the specific requirements for which are described in the service definition) from the resource supply manager (block 22). The service controller awaits a response from the resource supply manager indicating that the required resources are available and specifying which resources have been allocated. (block 24). The service definition may specify after how many unsuccessful requests for resources or after how long a period of time, the service should be abandoned. If the resources are available, the service controller starts the service instances on the allocated resources (block 26) and updates the name service (block 28) to describe what specific resources the service instances are running on. Once the service instances are running, the service controller monitors (block 30) the resources on which the service instances are being hosted to check for any instances of failure. If a service instance is indicated to have failed, the appropriate action may be taken, such as attempt to restart the service instance on the same resource (indicated by path 32) or request a new resource from the resource supply manager and restart the failed service instance on the new resource (path 34).

Figure 3:
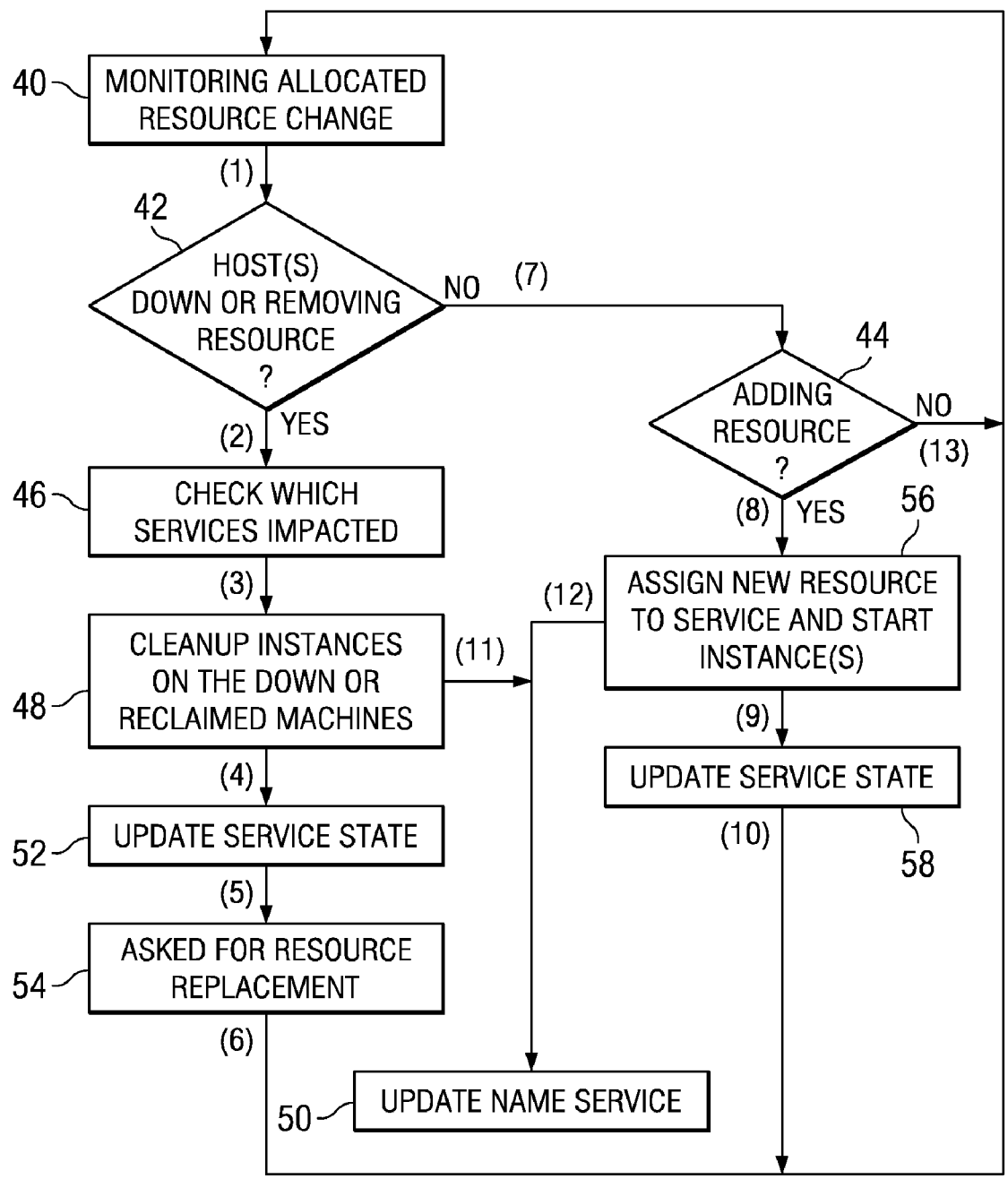
FIG. 3 is a flowchart illustrating the basic logic at the service controller to handle the situation where there is to be a change in the resource running a service.

FIG. 3 illustrates in more detail the basic logic involved at the service controller in the situation where there is to be a change in the allocated resource on which a service is being run. Once the service controller 4 has started up a defined service, it monitors the allocated resources on which the service is running. In a preferred embodiment, the resources are managed by the resource manager 8, and the resource manager will send any resource change information to the service controller 4. Situations in which there is a resource change can include: i) where there is a change in status of a host/allocated resource, for example, the host resource status changes from "up" to "down", or vice versa; ii) where new allocated resources have been made available, for example where one or more resources have been freed from other services; and iii) where resources are being reclaimed by the resource manager as a result of the resource allocation policies, for example, a competing request for the same resource by another service having a higher priority.

The service controller monitors each host/allocated resource (block 40) and checks whether it is "down" or if it is being reclaimed (block 42). If not, then it checks whether an additional resource is being made available (block 44). If not, then the query returns to complete the loop (block 40). However, if the service controller detects that a host/allocated resource is "down" or being reclaimed, it will determine which particular services and corresponding service instances will be impacted (block 46). The service controller will "clean up" the impacted service instances that are running on the host resource that is "down" or being reclaimed by asking the resource manager to shut down the service instances running on the resource (block 48). The name look-up service identifying the specific location(s) of the active service instances is updated (block 50). If appropriate, the service state or status may be updated (block 52). The service controller can take into account the service definition when determining whether the service state needs to updated. For example, if a service requires one instance to be running on one resource, when the host resource is "down" or being reclaimed, then the service state (service states are discussed in more detail below) will change from STARTED to ALLOCATING (i.e. service controller is waiting for a resource to be allocated before the service can be run); if there are two instances running on two resources, and a service requires 1-2 instances to be running on 1-2 resources, then if one resource is "down" or reclaimed, then the service state does not to be changed. The service controller then asks the resource manager to request a replacement resource. Referring to the Adding Resource step (block 44), where a new resource is being made available for the service, the new resource is allocated to the service and a new service instance is started on said new resource. At this point, the name look-up service is updated (block 50) and, if appropriate, the service state may be updated (block 58).

Figure 4:
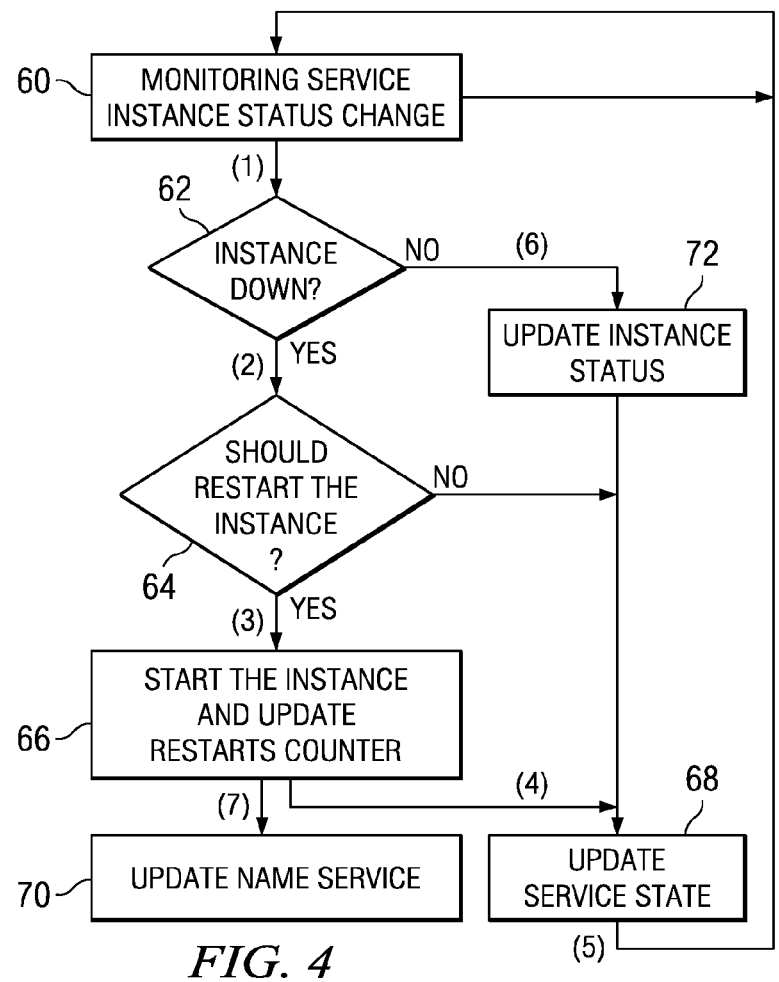
FIG. 4 is a flowchart illustrating the basic logic at the service controller to handle the situation where there is to be a change in the status of a service instance.

FIG. 4 is a flowchart illustrating the situation where there is a change in the status of a service instance. Once the service controller 4 has started up the defined service(s), it monitors the service instances for any change in status (block 60). If there is a service instance status change, the service controller checks whether the service instance is "down" (block 62), If so, then the service controller 4 will determine which service the service instance belongs to and determine whether the service instance should be restarted (block 64). The service controller 4 may check whether the number of restarts threshold for the service has been reached. If so, the service controller will stop restarting, and the service state will be updated. In practice, this situation can be flagged to allow system administrators to investigate why the service instances continually fail. If the service controller determines that the service instances should be restarted, then the service controller will issue a request to the resource manager to restart the service on the resource and update the restarts counter (block 66). The name look-up service can be updated and, if appropriate, the service states may be updated (block 70).

Figure 5:
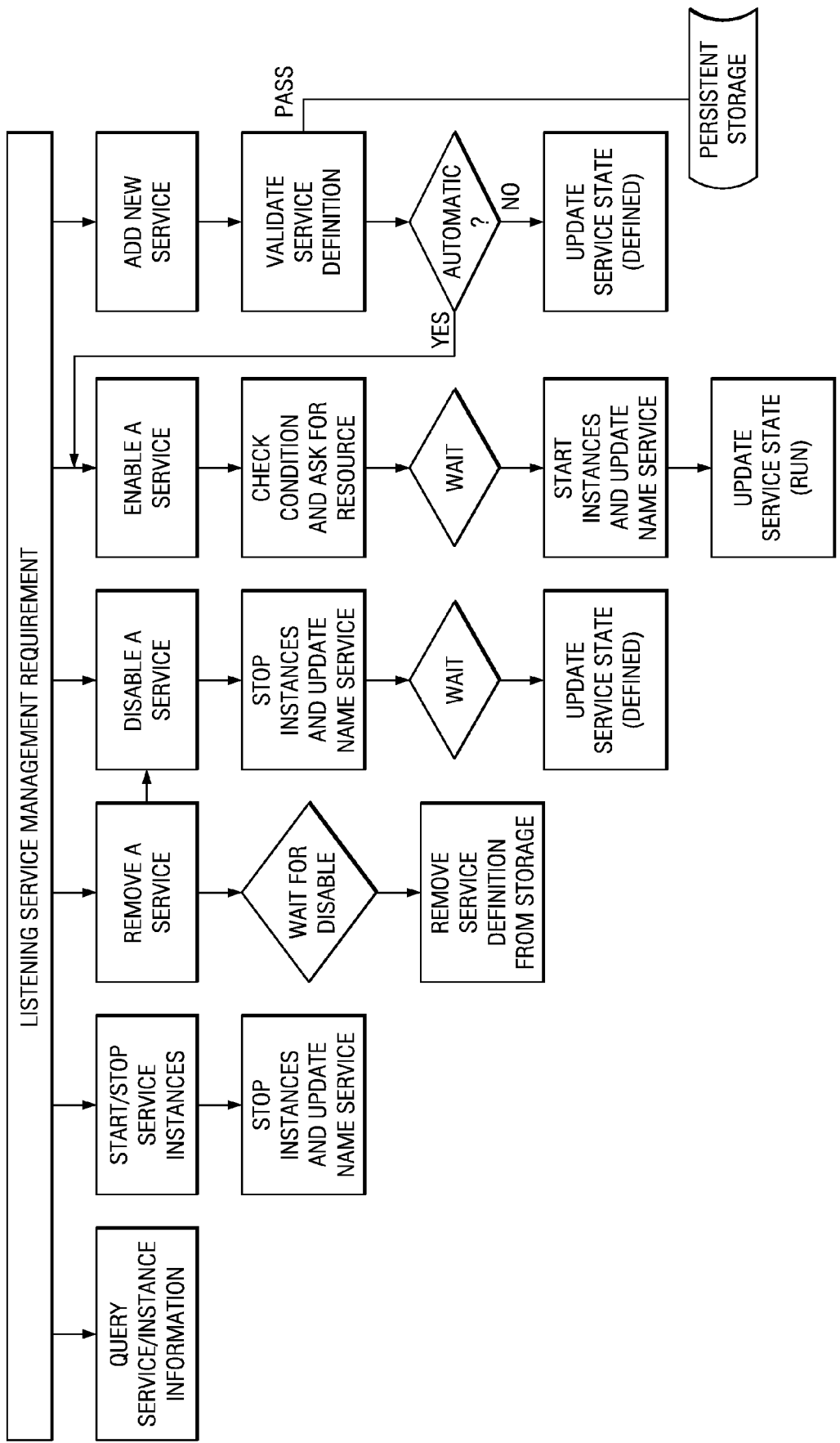
FIG. 5 is a flowchart illustrating the basic management of service instances at the service controller.

FIG. 5 is a flowchart illustrating the basic management of service instances at the service controller. By way of example, services may be added, enabled, disabled, removed, started and stopped.

Figure 6:
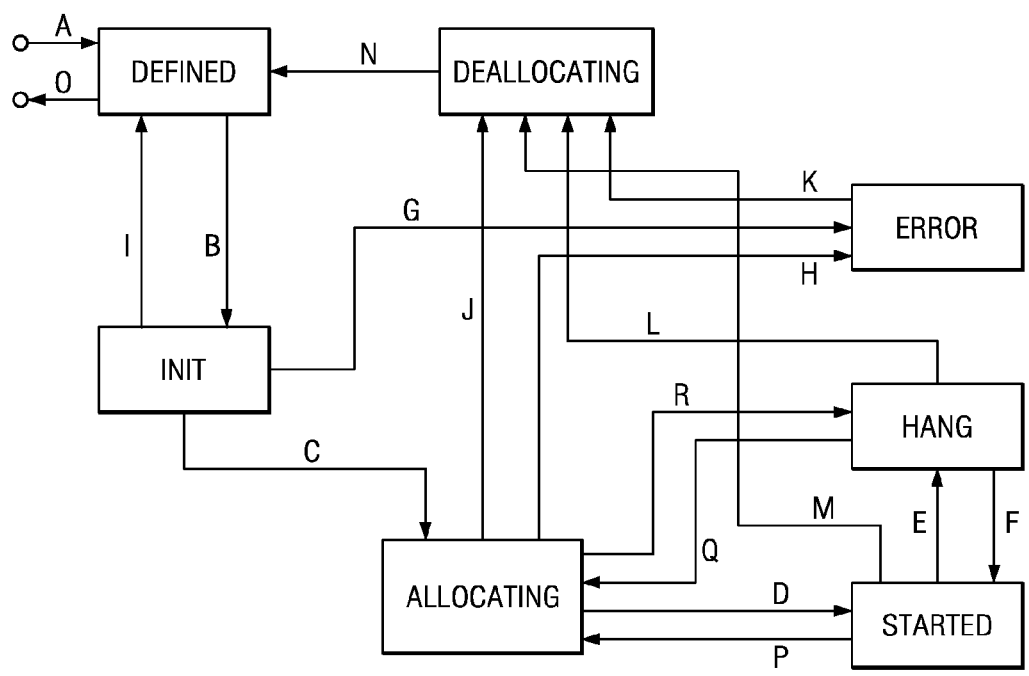
FIG. 6 is a service state transitions diagram, showing the different interactions at the service controller.

The service state transition diagram of FIG. 6 illustrates for a preferred embodiment of the service controller, the service states and the interactions that may occur at the service controller. There are seven basic states during the lifecycle of a service, as described in more detail below:

DEFINED: Service definition is loaded (or created through the application program interface (API) without syntax error. If a service is defined as requiring manual startup or has been disabled by the API, it will stay in this state. The service controller will reject service definitions with syntax error.

INIT: Service is enabled, since it is defined to start up automatically, or has been enabled by some other dependent service or by the API. At this state, the service controller will keep checking the service dependency. If all dependencies are satisfied, the service controller will contact the resource supply manager to allocate appropriate resource(s). After getting allocation from the resource supply manager, the service will move to ALLOCATING state.

ALLOCATING: Transition state. Service has received an allocation. Service controller is waiting for resource(s) from the resource supply manager. After getting enough resources, service controller will start service instances required.

STARTED: Service instances (more than the minimum number of instances required) are running and active.

ERROR: Any error in defined service detected by service controller. For example, service-level error (for example, the consumer on whose behalf the resources are being requested in order to run the services does not have the authority to be given the resources) or all service instances have failed and maximum permitted number of restarts has been exceeded. If the service is in ERROR state, it will keep track of the allocation for administrative troubleshooting purposes.

HANG: minimum number of service instances was previously reached, but total of active service instances is less than the required minimum. (A service instance is considered to be active, when the service controller continues to detect the heartbeat signal from the service instance within a threshold interval.

DEALLOCATING: Transition state. The service is disabled by service controller. Service controller will do cleanup at background. For example, terminate service instances, and deallocate resources if something is left over. After cleanup, the service will go back to DEFINED state.

With reference to FIG. 6, the state transitions are described in more detail below:

(A) NULL→DEFINED

The service definition is loaded successfully, or the service is created by API, and no outstanding error found. If the service is created by API, the service definition file is created.

(B) DEFINED→INIT

A service goes to INIT triggered by one of following conditions:

The service is defined as having "automatic" startup.

The service is defined as requiring "manual" startup, but its dependent service is in "INIT" state.

The service is defined as "manual" startup, and has been enabled by API Service controller marks the service to state DISABLED if it is defined as a "manual" startup or "disabled"; or the service was disabled through API last time for service controller recovery. When service is put in a DISABLED state, service controller will terminate service instances and deallocate resources.

(C) INIT→ALLOCATING

A service dependency will be checked. If such dependencies are satisfied, service controller will contact resource supply manger to get a resource allocation. After an allocation is returned, the allocation is active for the service.

(D) ALLOCATING→STARTED

Service controller will wait for an allocation notification from resource supply manager, and start service instances on the allocated resources/hosts. Service controller will listen for a service instance status change notification from the resource supply manager. If the service instance is terminated, service controller will start another one following control policies.

When there are enough running service instances to satisfy the minimum number of service instances required for a service, the service will go to STARTED state.

(E) STARTED→HANG

When service controller does not receive heartbeat message from a service instance as expected, the service instance(s) is(are) "hanging".

When there are insufficient active resources, as a result of hanging instances to satisfy the minimum service instance requirements for the particular service, the service is in a HANG state.

(F) HANG→STARTED

Service controller receives heartbeat message from hanging service instances as expected, the service instances will be "running".

When there are sufficient active service instances, to once again satisfy the minimum service instance requirements for the particular service, the service goes back to a STARTED state.

(G) INIT→ERROR

Service goes to ERROR under one of following conditions:
Service controller cannot make allocation for the service, for example, consumer does not exist.
Service controller cannot find other services that the service depends on.

(H) ALLOCATING→ERROR

Service controller is unable to obtain the required resources and the permitted number of retries has been exceeded.

(I) INIT→DEFINED

The service is disabled through API.

(J) ALLOCATING→DEALLOCATING (K) ERROR→DEALLOCATING (L) HANG→DEALLOCATING (M) STARTED→DEALLOCATING

The service is disabled through API. Service controller will terminate all allocated resources, or free the allocation.

(N) DEALLOCATING→DEFINED

Service controller will listen for service instances and allocation status notification. If all of them are cleaned up from resource supply manager, the service goes to DEFINED state.

(O) DEFINED→NULL

The service is removed. The service definition XML file will be removed.

(P) STARTED→ALLOCATING (Q) HANG→ALLOCATING

Service controller is listening for service instance status notification. Some of the service instances have been terminated, and number of active service instances is less than the minimum required to run the service.

(R) ALLOCATING→HANG

When there are insufficient active service instances, as a result of some started service instances hanging, to satisfy the minimum number of resources required to run a service, the service goes to HANG state.

The system may additionally facilitate the running of service instances in a heterogeneous resource environment, i.e. on different types of hardware or those using different operating systems, without requiring manual, human intervention. Information describing how service instances can be run on different hardware can be provided in the service definition. After the resources are allocated to the service, the service instances will be launched on the allocated resources using the appropriate information provided in the service definition.

Further, the disclosed system can simplify service management over the distributed computing environment. The service controller can provide for administrators/users to be able to start or stop a service, which service may have multiple concurrent instances running over the distributed computing environment, as a single identity.

While various embodiments of a service controller have been described above, it should be understood that these have been presented by way of example only, and not limitation. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification.

What is claimed is:

1. A system for centralized management of services in a distributed computing environment, comprising:
    a service controller installed on one or more computing devices, the service controller operable to receive or define a service definition that defines the required computing resources that are necessary to run a service in the distributed computing environment; and
    a computing resource supply manager distinct from but in communication with the service controller and operable to manage the supply of a plurality of computing resources in the distributed computing environment, the computing resource supply manager comprising a first interface for communication with the service controller and a second interface for communication with the plurality of computing resources;
    wherein the service controller is operable to request the required computing resources through the first interface of the computing resource supply manager,
    wherein the computing resource supply manager determines the availability of computing resources according to resource allocation policies and provides allocated computing resources to the service controller,
    wherein the service controller is operable to initiate at least one instance of the service to be run on at least one of the allocated computing resources,
    wherein the service controller is operable to monitor the status of the at least one instance of the service,
    wherein the service controller is operable to take action upon failure of the at least one instance of the service,
    wherein the service controller comprises a service director component operable to record or track the location of the at least one computing resource on which the at least one instance of the service is running,
    wherein the service director component is further operable to publish the location of the at least one computing resource on which the at least one instance of the service is running, and
    wherein such publishing allows an end-user of the service to access the service.

2. The system of claim 1, wherein the service definition defines that multiple service instances of a service are to be run concurrently, and wherein the service comprises multiple service instances.

3. The system of claim 2, wherein the service director component is operable to record or track the location of the computing resources on which the multiple service instances are running, wherein the service director component is further operable to publish the location of the computing resources on which the multiple service instances are running, and wherein such publishing allows the end-user of the service to access the service.

4. The system of claim 3, wherein the service director component is operable to record or track the location of computing resources on which the multiple service instances are running according to the computing resources' IP addresses.

5. The system of claim 4, wherein the service director component publishes the location of the computing resources on which the service is running through a domain name system.

6. The system of claim 1, wherein the service director component is operable to record or track the location of the at least one computing resource on which the service is running according to the at least one computing resource's IP address.

7. The system of claim 6, wherein the service director component publishes the location of the computing resources on which the service is running through a domain name system.

8. The system of claim 1, wherein the service controller is in communication with the computing resources through a computer network.

9. The system of claim 1, wherein the service controller is operable to monitor the status of the computing resources through the service controller's communication with the resource supply manager.

10. The system of claim 1, wherein the action involves restarting the service instance on the computing resource.

11. The system of claim 1, wherein the action involves requesting a replacement computing resource and restarting the service instance on said replacement computing resource.

12. The system of claim 1, wherein the service definition defines an acceptable range for a number of service instances of a service that may be run concurrently.

13. The system of claim 12, wherein the number of active service instances dynamically fluctuate within the acceptable range, as the resource supply manager provides additional computing resources on which additional service instances may be run or demands computing resources be returned, in accordance with changes in supply of and demand for computing resources in the distributed computing environment.

14. The system of claim 1, wherein the service controller manages a plurality of services, and wherein each service is designated a priority, and wherein the service controller manages the services taking into account said priorities.

15. The system of claim 1, wherein the service controller manages a plurality of services, and wherein the service controller manages the services taking into account dependencies among the services.

16. The system of claim 1, wherein there are multiple service instances of the service running on the allocated computing resources and wherein the service instances of the service are adaptive for running in a heterogeneous resource environment.

17. A service controller installed on one or more computing devices, the service controller for centralized management of services in a distributed computing environment, the distributed computing environment having a computing resource supply manager for managing the supply of computing resources in the distributed computing environment,
- wherein the service controller is provided with a service definition which defines the required computing resources which are necessary to run a service and wherein the service controller requests the required computing resources through the computing resource supply manager,
- wherein the computing resource supply manager determines the availability of computing resources according to resource allocation policies and provides allocated computing resources to the service controller,
- wherein the service controller is operable to initiate an instance of the service to be run on the allocated computing resources,
- wherein the service controller is operable to monitor the status of the instance of the service,
- wherein the service controller is operable to take action upon failure of the instance of the service,
- wherein the service controller comprises a service director component operable to record or track the location of the computing resources on which an instance of the service is running,
- wherein the service director component is further operable to publish the location of the computing resources on which the instance of the service is running, and
- wherein such publishing allows an end-user of the service to access the service.

18. A method for centralized management of services in a distributed computing environment, comprising the steps of:
- loading a service definition for a service on a service controller installed on one or more computing devices, wherein the service definition defines the required computing resources which are necessary to run the service;
- requesting, by the service controller, the required computing resources from a computing resource supply manager distinct from the service controller for managing the supply of computing resources in the distributed computing environment, wherein the computing resource manager determines the availability of the required computing resources according to resource allocation policies;
- providing, by the resource supply manager, allocated computing resources to the service controller where the required computing resources are available;
- initiating, by the service controller, a service instance of the service to be run on the allocated computing resources;
- recording, by the service controller through a service director component of the service controller, the location of the computing resources on which each service instance of the service is running; and
- publishing, by the service controller through the service director component of the service controller, the location of the computing resources on which each service instance of the service is running, wherein such publishing allows an end-user of the service to access the service.

19. The method of claim 18, wherein the service director component utilizes an IP address to record the location of computing resources on which each instance of the service is running.

20. The method of claim 18, comprising the additional steps of the service controller monitoring the status of the computing resources on which each service instance of the service is running, for instances of failure, and where there is an instance of failure, restarting the service instance on the computing resource for which the service instance has failed.

21. The method of claim 18, comprising the additional steps of the service controller monitoring the status of the computing resources on which each service instance of the service is running, for instances of failure, and where there is an instance of failure, requesting a replacement computing resource from the computing resource supply manager and restarting the service instance that has failed on the replacement computing resource and updating through the service director component the location of the replacement computing resource.

22. The method of claim 18, wherein the service definition defines an acceptable range for the number of service instances of a service that are to be run concurrently.

23. The method of claim 22, wherein the number of active service instances dynamically fluctuate within the acceptable range, as the resource supply manager provides additional computing resources on which additional service instances may be run or demands computing resources be returned, in accordance with changes in supply of and demand for computing resources in the distributed computing environment.

24. The method of claim 19 comprising the additional steps of the service controller monitoring the status of the computing resources on which each service instance of the service is running, for instances of failure, and where there is an instance of failure, restarting the service instance on the computing resource for which the service instance has failed.

25. The method of claim 19, comprising the additional steps of the service controller monitoring the status of the computing resources on which each service instance of the service is running, for instances of failure, and where there is an instance of failure, requesting a replacement computing resource from the computing resource supply manager and restarting the service instance that has failed on the replacement computing resource and updating through the service director component the location of the replacement computing resource.

* * * * *